Dec. 15, 1931.  K. RICHTER  1,837,068
RECEPTACLE FOR HOLDING AND FORWARDING VICTUALS AND FOODSTUFFS
Filed June 19, 1928
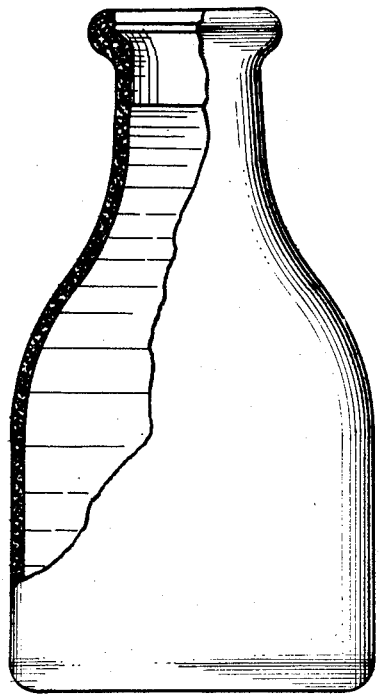

Patented Dec. 15, 1931

1,837,068

UNITED STATES PATENT OFFICE

KARL RICHTER, OF BERLIN-CHARLOTTENBURG, GERMANY

RECEPTACLE FOR HOLDING AND FORWARDING VICTUALS AND FOODSTUFFS

Application filed June 19, 1928, Serial No. 286,570, and in Austria August 10, 1927.

The present invention relates to a receptacle for preserving the nutritive and taste properties of milk and milk products.

An example of the subject matter of the invention is illustrated schematically in the accompanying drawing.

For holding and forwarding milk and milk products, glass, tin, wood and other receptacles have hitherto been employed. These receptacles are as far as possible closed tightly to prevent foreign matters reaching the contents of the receptacles.

The idea forming the subject matter of this invention is to provide a receptacle for holding and forwarding milk and milk products or other liquids having properties similar to milk, as fruit juices, which not only prevents the penetration of injurious, undesirable foreign matters but at the same time permits as far as possible the free access of air which is both desirable and useful.

The receptacle consists of an unglazed, partly or wholly glazed clay, earthenware, kaolin or other similar porous materials, which are bad conductors of heat and impervious to light but allow the passage of air through them.

These porous receptacles ensure a continual and ample ventilation of the contents and prevent the penetration of light, which is so detrimental to many liquids; besides which, owing to their being bad conductors of heat and permitting the evaporation of the water, they further effect a cooling of the contents.

If such receptacles with their contents are subjected to violent motions, such as occur during transport, the air and consequently the oxygen flow through them in a strong current. Oxygen, however, preserves the natural nutritive and flavoring properties and prevents the milk and milk products from becoming bad through the formation of acid or mildew germs.

A further advantage of these receptacles is the low price at which they can be produced in large quantities; thus permitting of their being used but once and then being thrown away as worthless packing. This obviates the tedious, unreliable and always questionable hygienic cleaning, as in the case of glass receptacles.

I claim:

1. A milk bottle of porous ceramic ware and a hermetic sealing cap therefor.

2. A milk bottle of porous material exteriorly glazed and a hermetic sealing cap therefor.

3. A milk bottle of porous ceramic ware, having a mouth, and a hermetic seal therefor, said bottle free of direct air holes through it and acting as a bacterial filter.

In testimony whereof I affix my signature.

DR. KARL RICHTER.